G. E. STANLEY.
SHOCK ABSORBING MECHANISM FOR VEHICLES.
APPLICATION FILED DEC. 21, 1918.
1,309,490.
Patented July 8, 1919.
2 SHEETS—SHEET 1.
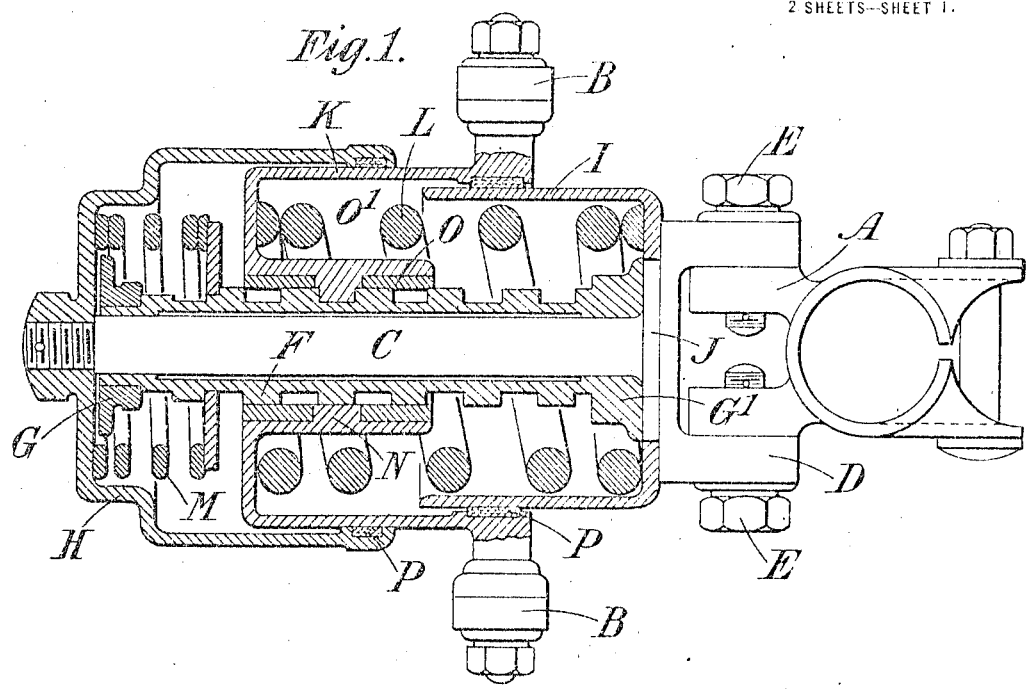
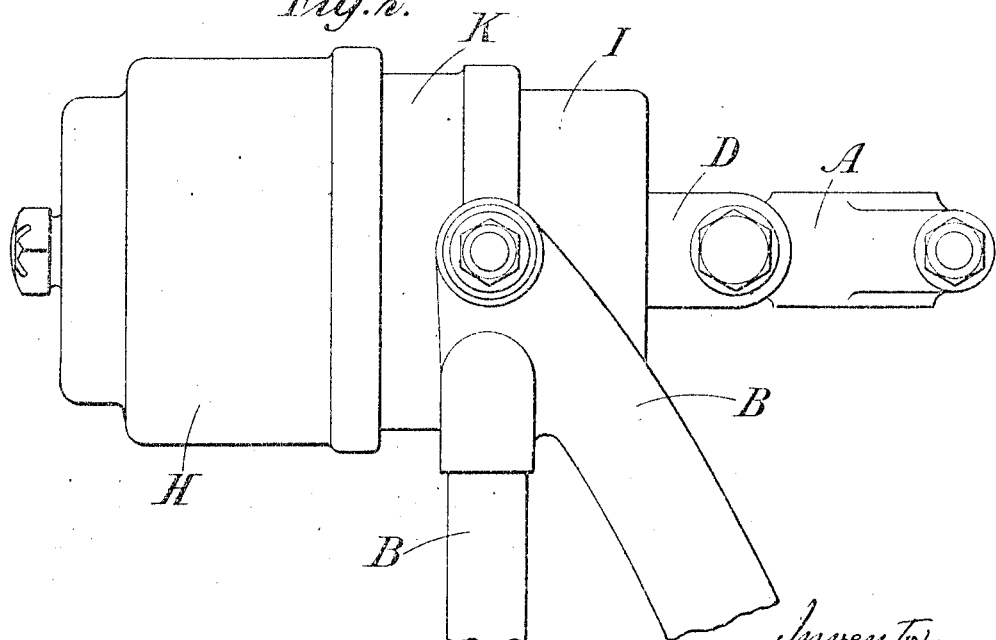

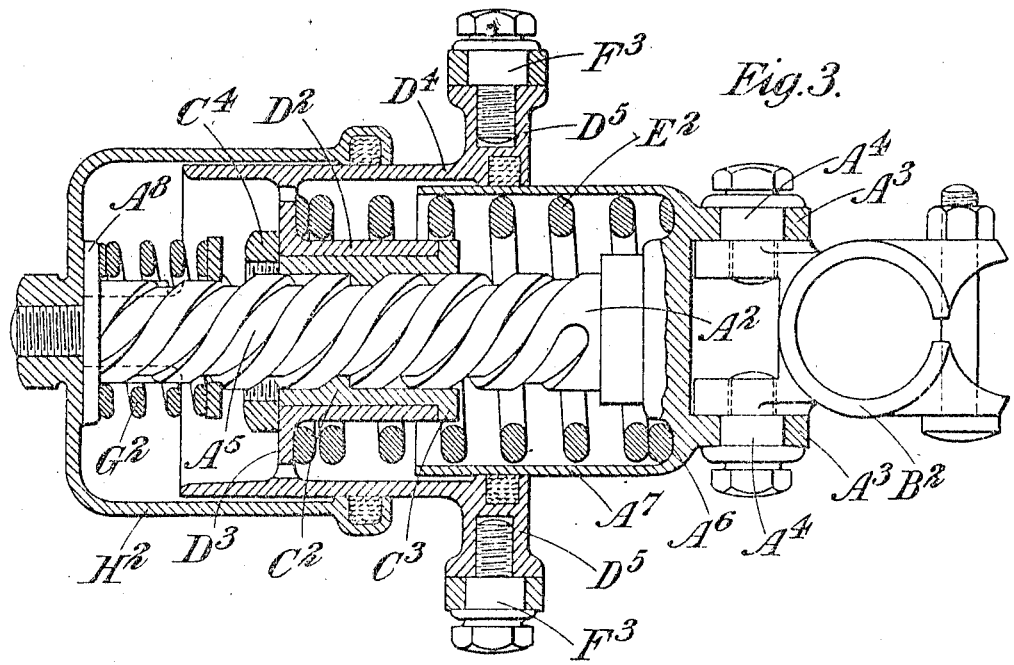
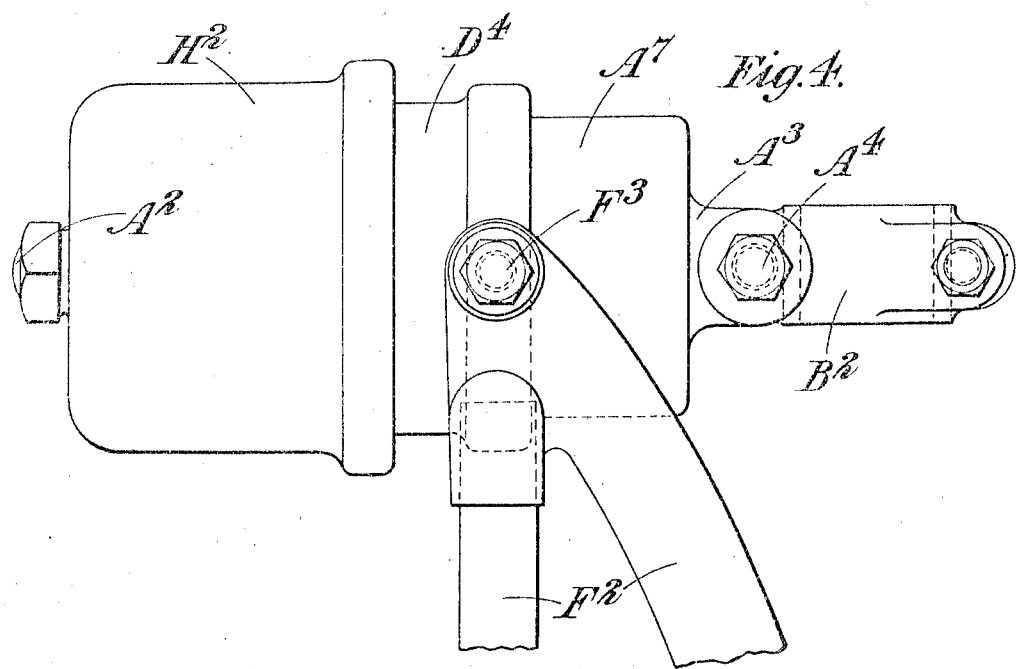

UNITED STATES PATENT OFFICE.

GEORGE ENOCH STANLEY, OF COVENTRY, ENGLAND.

SHOCK-ABSORBING MECHANISM FOR VEHICLES.

1,309,490.   Specification of Letters Patent.   Patented July 8, 1919.

Application filed December 21, 1918. Serial No. 267,879.

*To all whom it may concern:*

Be it known that I, GEORGE ENOCH STANLEY, a subject of the King of England, residing in Coventry, Warwickshire, England, have invented certain new and useful Improvements in Shock-Absorbing Mechanism for Vehicles, of which the following is a specification.

This invention relates to improvements in shock-absorbing mechanism of the type wherein the movement of a cushioning spring which receives the shock of the moving parts is checked by the employment in conjunction with the latter of a braking device consisting of a quick-threaded screw on one moving part and a nut to engage it on the other moving part, these elements being so disposed that the axial movement of the one causes the rotation of the other against the action of a brake which checks its rotation to thereby assist in bringing the moving parts to rest before the cushioning spring receives the full load imposed by the shock.

In a known construction, the rotating member is gripped endwise between brake-rings, which receive the pressure of the cushioning-spring, whereby the load upon them is progressively increased as the spring is deformed. Such a construction is liable to cause so sudden a check to the rotating member and thereby also to the movement of the cushioned parts as to considerably affect the degree of resiliency they would otherwise possess, and it is the object of the present invention to so arrange the braking device that the retardation obtained by these means shall be approximately constant throughout the travel of the cushioned parts.

The invention is illustrated in the accompanying drawing as applied between the steering-tube and the upper part of a motor-cycle front fork pivoted to the steering tube.

In the accompanying drawing:—

Figure 1 is a plan, partly in section, and Fig. 2 is a side elevation.

Fig. 3 is a plan, partly in section, of a modified construction, and

Fig. 4 is a side elevation of the modification.

In the construction shown in Figs. 1 and 2, the pressure applied to the brake-ring is derived solely from the end-thrust between the screw-threaded members which causes their relative rotation. By this construction the braking action on the rotating member is unaffected by the degree of deformation of the cushioning spring, and as the amount of thrust on the brake-ring does not exceed that necessary to overcome the frictional resistance to rotation produced by its own pressure plus the endwise resistance due to the engagement of the screw-threads, the braking action is approximately constant throughout the travel of the cushioned parts.

The quick-threaded screw is formed externally upon a rotatable sleeve provided with an end flange whose outer face is caused to bear against a brake-ring by the endwise pressure of the nut upon the aforesaid quick-threaded screw.

Referring to Figs. 1 and 2, A is a clamp for gripping the steering tube, and B is the upper part of a stayed front fork. C is a spindle provided with a forked end D pivoted to the clamp A on pivot studs E; and F is a sleeve carried rotatably on the spindle C and provided at each end with flanges G, G¹, one of which is adapted to engage frictionally with the forked end of the spindle C, constituting a brake-ring, and the other with the inside of a cap H carried on the end of the spindle C. A cap I is rotatably mounted on a bearing J formed on the face of the fork D, and a cap K is mounted on the sleeve F opposite to the cap I. The cap K is pivoted to the upper part of the front fork B, and a cylindrical helical spring L is adapted to be compressed between the two caps I and K when the fork rocks owing to inequalities in the road. A second helical spring M is adapted to be compressed between the inside of the cap H and the back of the cap K, on the recoil of the fork after compressing the spring L.

The rotatable sleeve F is provided with an external square screw-thread of rapid pitch which engages a screw-threaded nut N integral with the cap K. The screw-thread is first formed completely through the nut and is afterward cut away at each end and replaced by bushes O, O¹, which are held in position in any suitable manner and are a good fit on the outside of the thread on the sleeve F. The caps are packed at P to prevent the leakage of lubricant and to exclude dirt.

When the fork B rocks on its pivot on the steering tube, it first moves the sleeve F endwise (against the pressure of the spring L) so that the flange G¹ engages the annular end-surface of the bearing J formed on the forked end of the spindle C. Further movement causes the screwed sleeve F to rotate as the nut N is forced along it. This further movement also compresses the spring L, and thus the movement is cushioned by the resistance of the spring, the friction between the screwed sleeve and its nut, and the friction between the flange G¹ and the annular end-surface of the bearing J upon the forked end of the spindle C. Similarly on the recoil, the movement is cushioned by the friction between the flange G and cap H, the screwthread friction, and the compression of the spring M.

Referring to Figs. 3 and 4, the externally threaded part is non-rotatable and the nut which engages it is, by the movement of the cushioned parts, thereby caused to rotate and to bear endwise against the housing which carries it, (for example, to bear against it by means of radial flanges or their equivalents formed upon the nut to engage corresponding faces on the housing). In certain types of shock-absorbers this provides a more convenient arrangement than when constructed with a non-rotatable nut and a rotatable screw which engages it.

A spindle A² provided with a forked end A³ is by means of studs A⁴ pivotally connected with a clamp B² which grips the steering-tube. Formed upon the spindle A² is a quick-threaded screw A⁵. A correspondingly threaded nut C² engages the screw A⁵ and is rotatably mounted in a housing D² provided with a radial end flange D³. The nut C² is at one end provided with a shoulder C³ which bears against the end of the housing D², and at the other end of it is externally screw-threaded to receive a correspondingly screw-threaded collar C⁴ which thus forms an adjustable shoulder to bear against the other end of the housing D². Thus the shoulder C³ and collar C⁴ prevent endwise movement of the nut C² in its housing, and the collar C⁴ provides for adjustment or renewal of the nut C² as may be necessary.

A cushioning-spring E² of coil form is mounted to bear at one end on the flange D³ and at the other end on a shoulder A⁶ formed on the spindle A², to be compressed between them when they approach one another. From the edge of the shoulder A⁶ a sleeve A⁷ extends over the spring E², and from the edge of the flange D³ a sleeve D⁴ also extends over the spring E² to form a telescopic joint with the sleeve A⁷. To the sleeve D⁴ are attached radially disposed lugs D⁵ which receive the pivot studs F³ by means of which the ends of the front fork F² are connected to it.

A second coil-spring G² is mounted in the shock-absorber between the face of the flange D³ opposite to that on which the spring E² bears, and a flange A⁸ carried at the outer end of the spindle A². The spring G² is thus adapted to receive the recoil action of the spring E² after the latter has been compressed. The sleeve D⁴ is extended forwardly over the spring G² and a cup-shaped member H² is secured at the end of the spindle A² to inclose the spring G² and at its open end to slide telescopically over the sleeve D⁴.

When the fork F² rocks about its pivotal connection to the steering-tube (not shown in the drawing) owing to road inequalities or other causes, the sleeve D⁴ is moved endwise relatively to the spindle A² to cause the cushioning-springs to act in known manner. At the same time the nut C² by its threaded connection with the spindle A² is caused to rotate in its housing D² and to be thrust endwise therein so that its shoulder C³ or its collar C⁴ is caused to bear frictionally against the end of the housing D² which thus acts as a brake upon it to retard its rotation.

Obviously if desired the recoil spring G² may be omitted if the ends of the spring E² are anchored to the parts on which they bear, so that the spring E² can be extended as well as compressed.

Furthermore, if desired, the thread A⁵ instead of being integral with the spindle A² may be formed upon a sleeve fast upon the spindle A².

It will be obvious that shock-absorbers of this type can be employed for other mechanism than that described and illustrated in the drawing. Also it is possible to employ only one spring operating both in tension and compression. For example, the spring L can be connected at one end to the cap I and at the other end to the cap K, and the spring M can be dispensed with.

What I claim as my invention and desire to secure by Letters Patent is:—

1. In a shock absorber for the purpose described, the combination with two relatively movable parts and a cushioning spring interposed therebetween, of a quick-threaded screw on one of said movable parts, a nut on the other movable part to engage said screw, and two friction elements brought in contact by the axial movement of the one part and consequent rotation of the other, the one friction element being constituted by a flange formed on the one end of the said screw, and the other by the bearing for one of said movable parts.

2. A construction as specified in claim 1, in which, in addition to said cushioning spring, a second cushioning spring is provided to receive the recoil of said first cushioning spring, and a movable member inclosing said second cushioning spring.

In testimony whereof I have signed my name to this specification in the presence of two subscribing witnesses.

GEORGE ENOCH STANLEY.

Witnesses:
 ALBERT BROWN,
 N. F. MALTBY.